US012678865B2

(12) United States Patent　　　(10) Patent No.: US 12,678,865 B2
Block　　　　　　　　　　　　　　(45) Date of Patent: Jul. 14, 2026

(54) CORING TOOL

(71) Applicant: Michael Block, Covington, IN (US)

(72) Inventor: Michael Block, Covington, IN (US)

( * ) Notice: Subject to any disclaimer, the term of this patent is extended or adjusted under 35 U.S.C. 154(b) by 530 days.

(21) Appl. No.: 18/315,588

(22) Filed: May 11, 2023

(65) Prior Publication Data

US 2023/0373014 A1　　Nov. 23, 2023

Related U.S. Application Data

(60) Provisional application No. 63/343,369, filed on May 18, 2022.

(51) Int. Cl.
B23B 47/28　　　(2006.01)

(52) U.S. Cl.
CPC ........ B23B 47/287 (2013.01); B23B 2247/06 (2013.01)

(58) Field of Classification Search
CPC .... B23B 47/28; B23B 47/287; B23B 2247/06
See application file for complete search history.

(56) References Cited

U.S. PATENT DOCUMENTS 2,497,733 A * 2/1950 Kebour ................. B23B 47/287
　　　　　　　　　　　　　　　　　　　 408/109
2,519,468 A * 8/1950 Hengst ................. B23B 47/287
　　　　　　　　　　　　　　　　　　　 408/97

3,021,734 A * 2/1962 Schlage ................ B23B 47/287
　　　　　　　　　　　　　　　　　　　 408/202
3,635,571 A * 1/1972 Roberts ................. B23B 47/287
　　　　　　　　　　　　　　　　　　　 408/97
4,521,140 A * 6/1985 Doescher .............. B23B 47/287
　　　　　　　　　　　　　　　　　　　 408/97
4,601,618 A * 7/1986 McEldowney .......... B23Q 3/18
　　　　　　　　　　　　　　　　　　　 408/82
4,952,101 A * 8/1990 Coombs ................ B23B 47/287
　　　　　　　　　　　　　　　　　　　 408/241 B
6,390,738 B1 * 5/2002 Fridman ............... B23B 47/287
　　　　　　　　　　　　　　　　　　　 408/103
6,398,465 B1 * 6/2002 Monge ..................... B27F 5/12
　　　　　　　　　　　　　　　　　　　 279/143

* cited by examiner

*Primary Examiner* — Eric A. Gates
(74) *Attorney, Agent, or Firm* — Schmeiser, Olsen & Watts LLP

(57)　　　　　　　　ABSTRACT

A coring tool for coring doors is provided. The coring tool may include a tool body having a first end and an opposing second end and a clamp member coupled to the tool body adjacent the second end. The tool body and the clamp member are moveable toward and away from each other in response to operation of a clamp actuator. The coring tool may also include a head having guide bushings for inserting a bit through the guide bushings for coring a door. The head may be coupled adjacent the first end of the tool body and the head may be movable toward and away from the tool body to align the guide bushing with the door to be cored.

9 Claims, 14 Drawing Sheets

CORING TOOL

CROSS REFERENCE TO RELATED APPLICATION[S]

This application claims priority to U.S. Provisional Patent Application entitled "CORING TOOL," Ser. No. 63/343,369, filed May 18, 2022, the disclosure of which is hereby incorporated entirely herein by reference.

BACKGROUND OF THE INVENTION

1. Technical Field

This invention generally relates to coring tools and more particularly to coring tools for positioning and guiding drill bits and methods for using such coring tools to drill elongate holes through a door without marring a surface of the door.

2. State of the Art

In the past, technicians installing security systems on doors have used line of sight to align a bit during hand drilling of a hole in a generally widthwise direction from a hinge area to a bolt area of a security door. Often this method of "eye-balling" has resulted in ruining or damaging the door by drilling through a front or rear surface of the door. Drill bit jigs exist that provide for a system that clamps on each side of the door, creating a cumbersome tool and clamps to opposing side edges in order to secure the jig.

There is a need for a new and improved coring tool that overcomes the deficiencies of existing jigs.

SUMMARY OF THE INVENTION

The present invention relates generally to jigs and more particularly to jigs for positioning and guiding drill bits during a drilling operation.

An embodiment includes a coring tool for coring doors, the coring tool comprising a tool body having a first end and an opposing second end; a clamp member coupled to the tool body adjacent the second end, wherein the tool body and the clamp member are moveable toward and away from each other in response to operation of a clamp actuator; and a head comprising guide bushings for inserting a bit through the guide bushings for coring a door, the head coupled adjacent the first end of the tool body and the head is movable toward and away from the tool body to align the guide bushing with the door to be cored.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
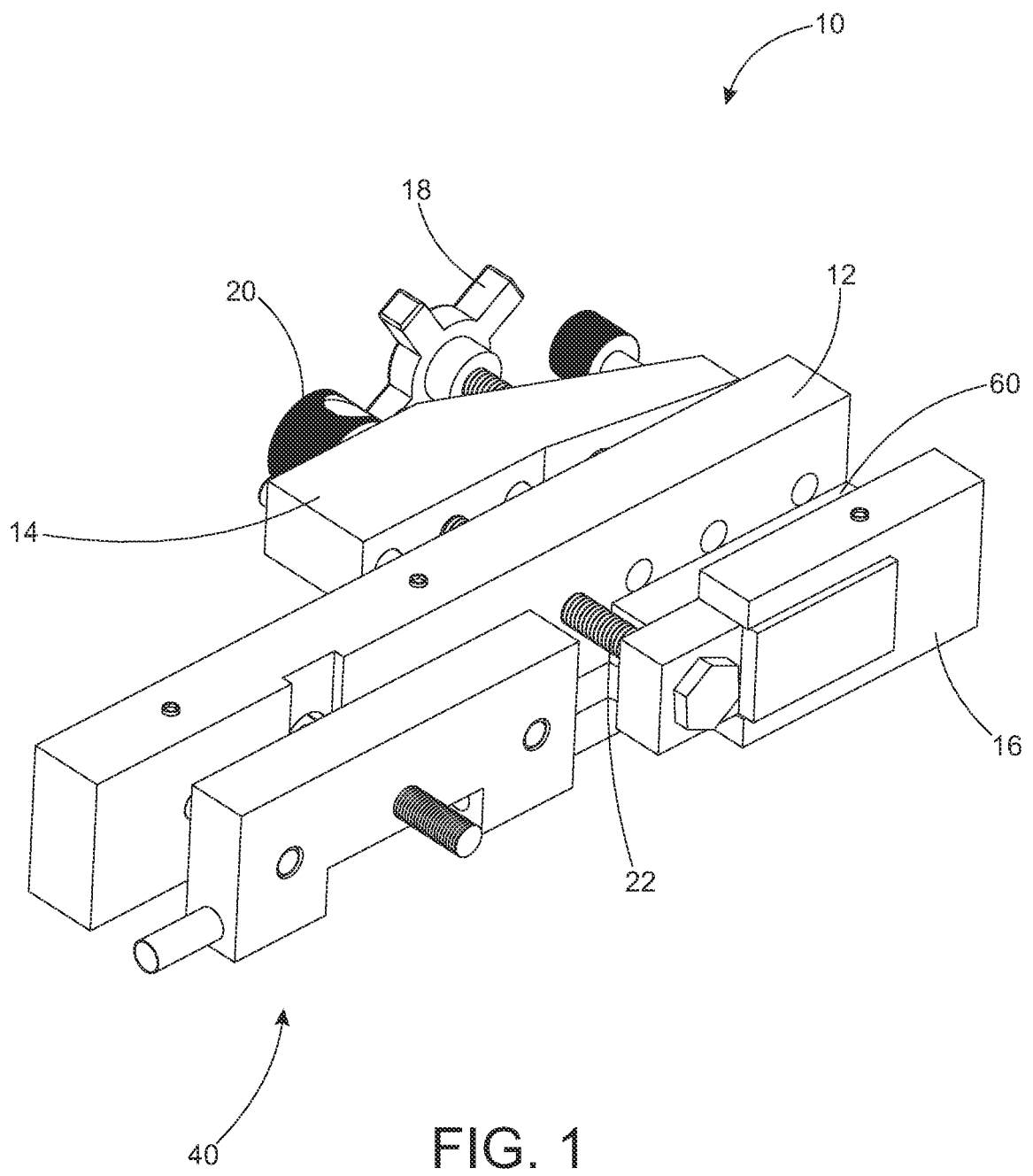
FIG. 1 is a perspective view of a coring tool secured to a door, in accordance with the present invention.
Figure 2:
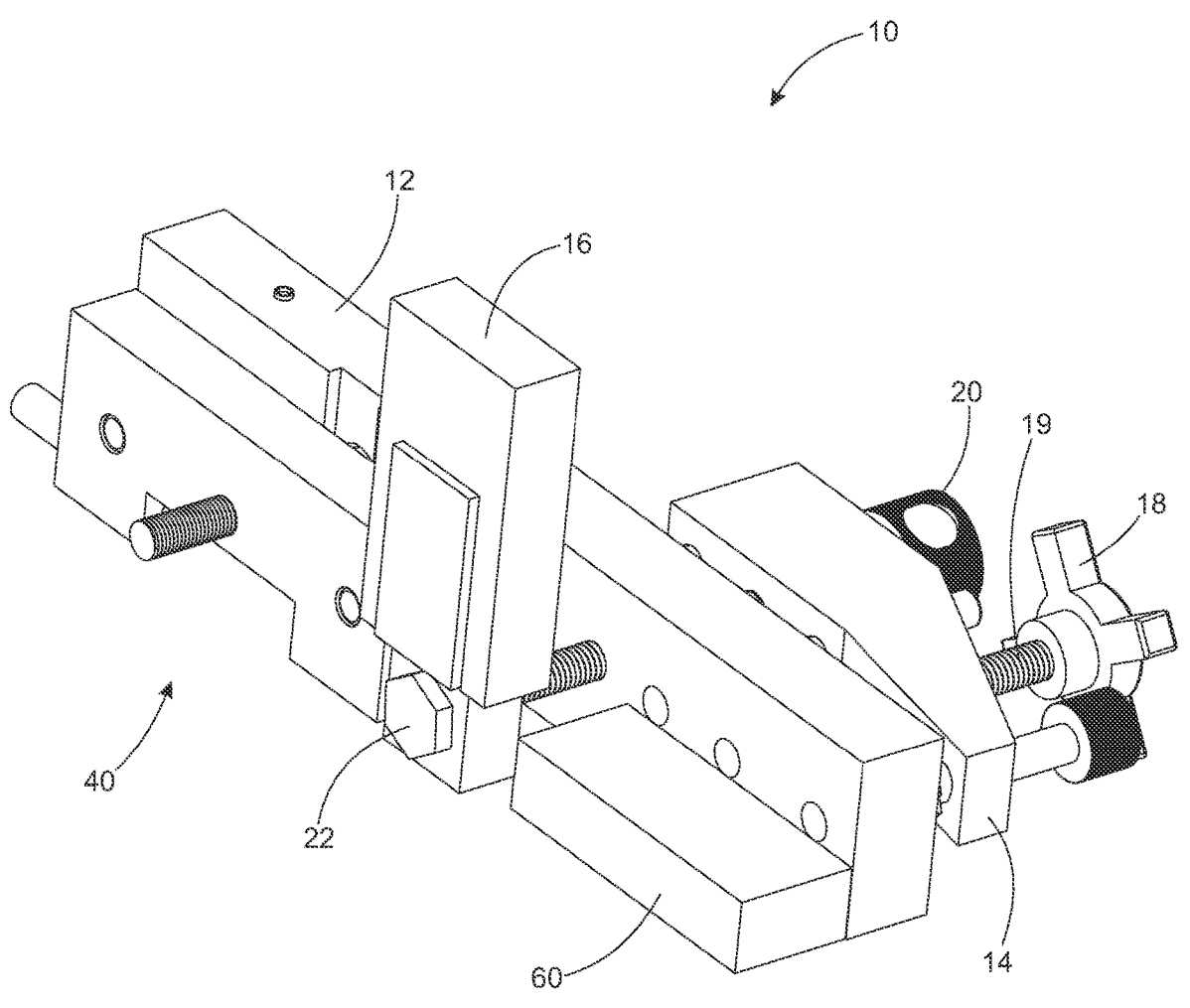
FIG. 2 is a perspective view of a coring tool secured to a door, in accordance with the present invention.
Figure 3:
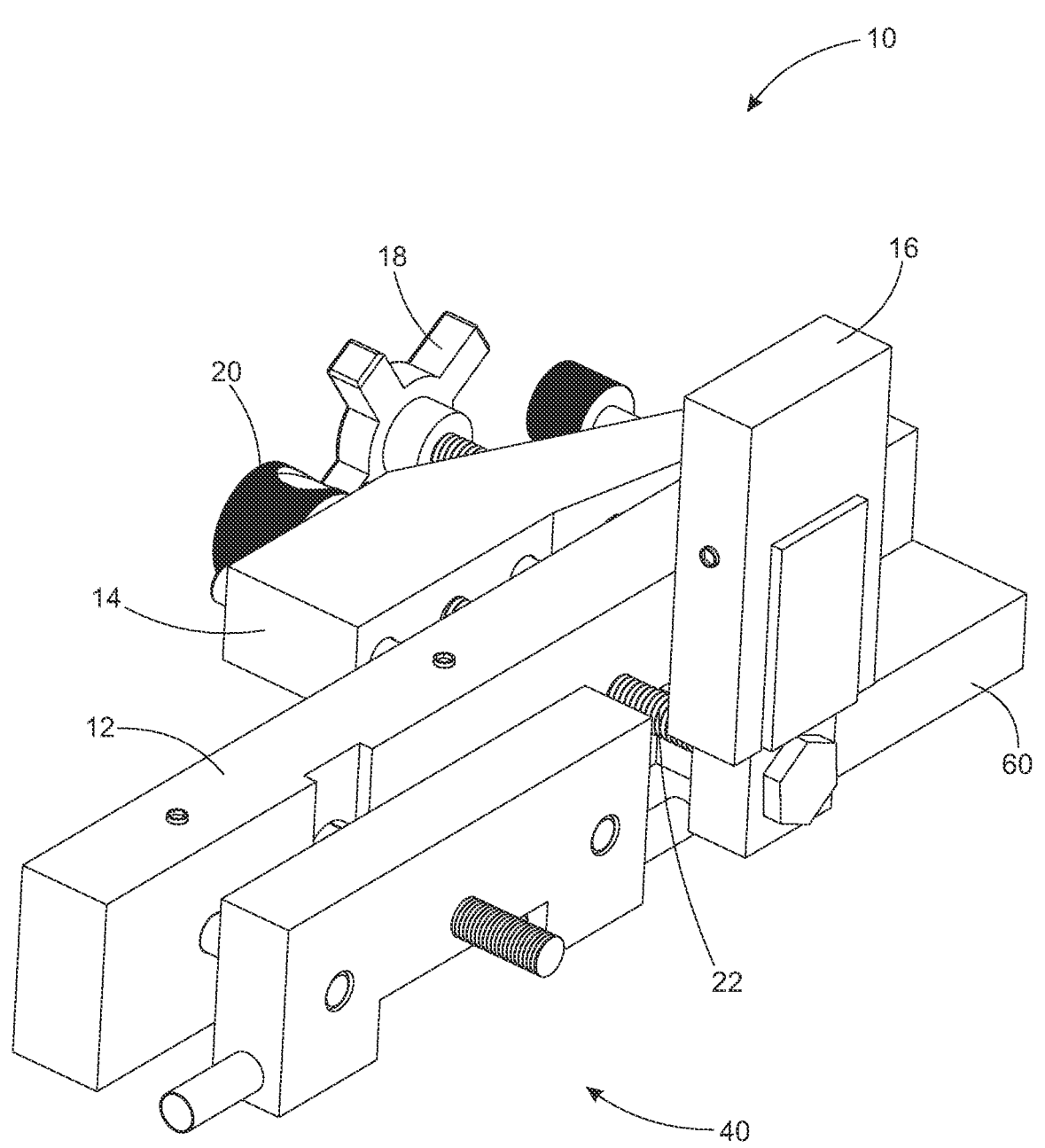
FIG. 3 is a perspective view of a coring tool secured to a door, in accordance with the present invention.
Figure 4:
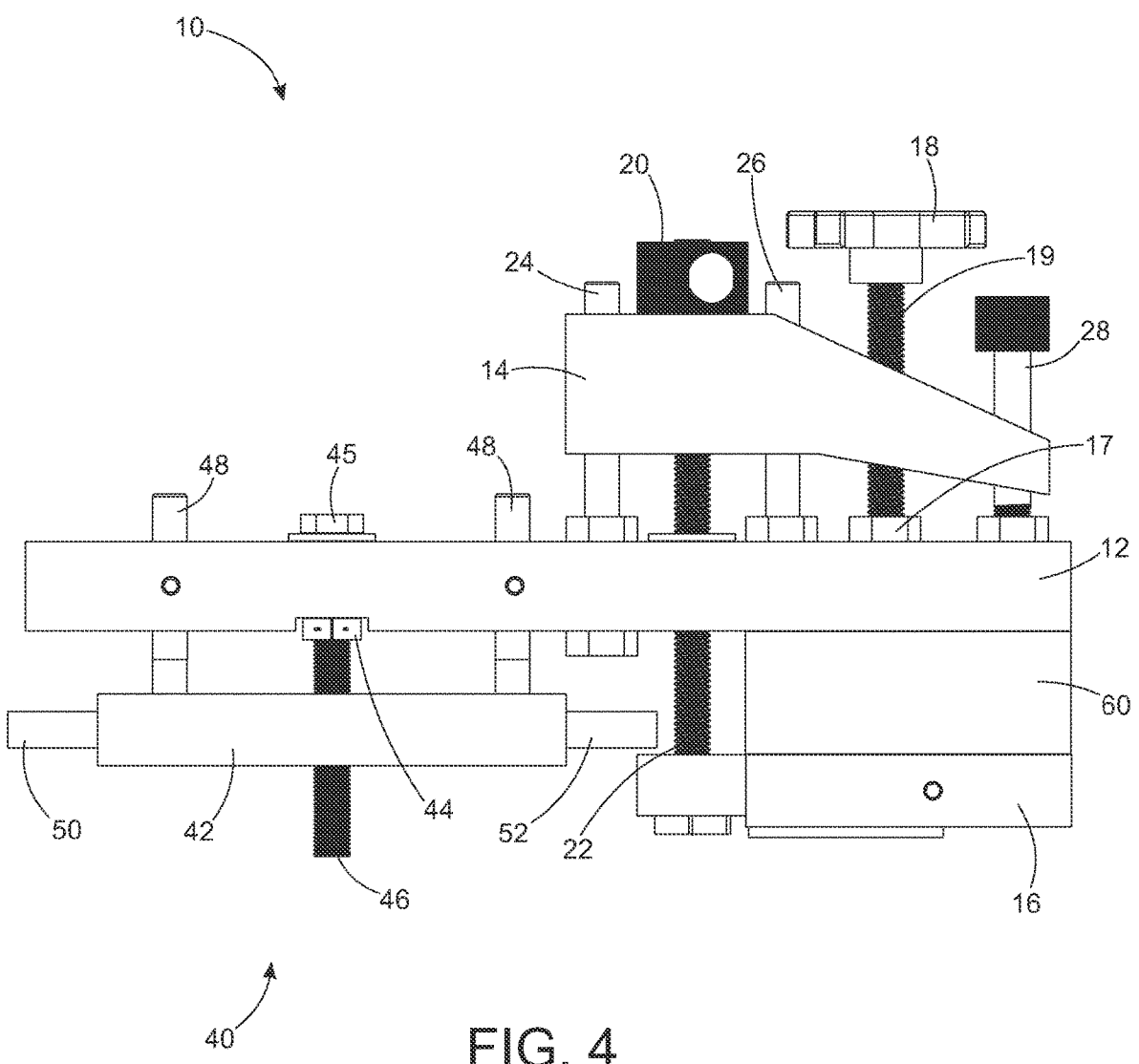
FIG. 4 is a first side view of a coring tool secured to a door, in accordance with the present invention.
Figure 5:
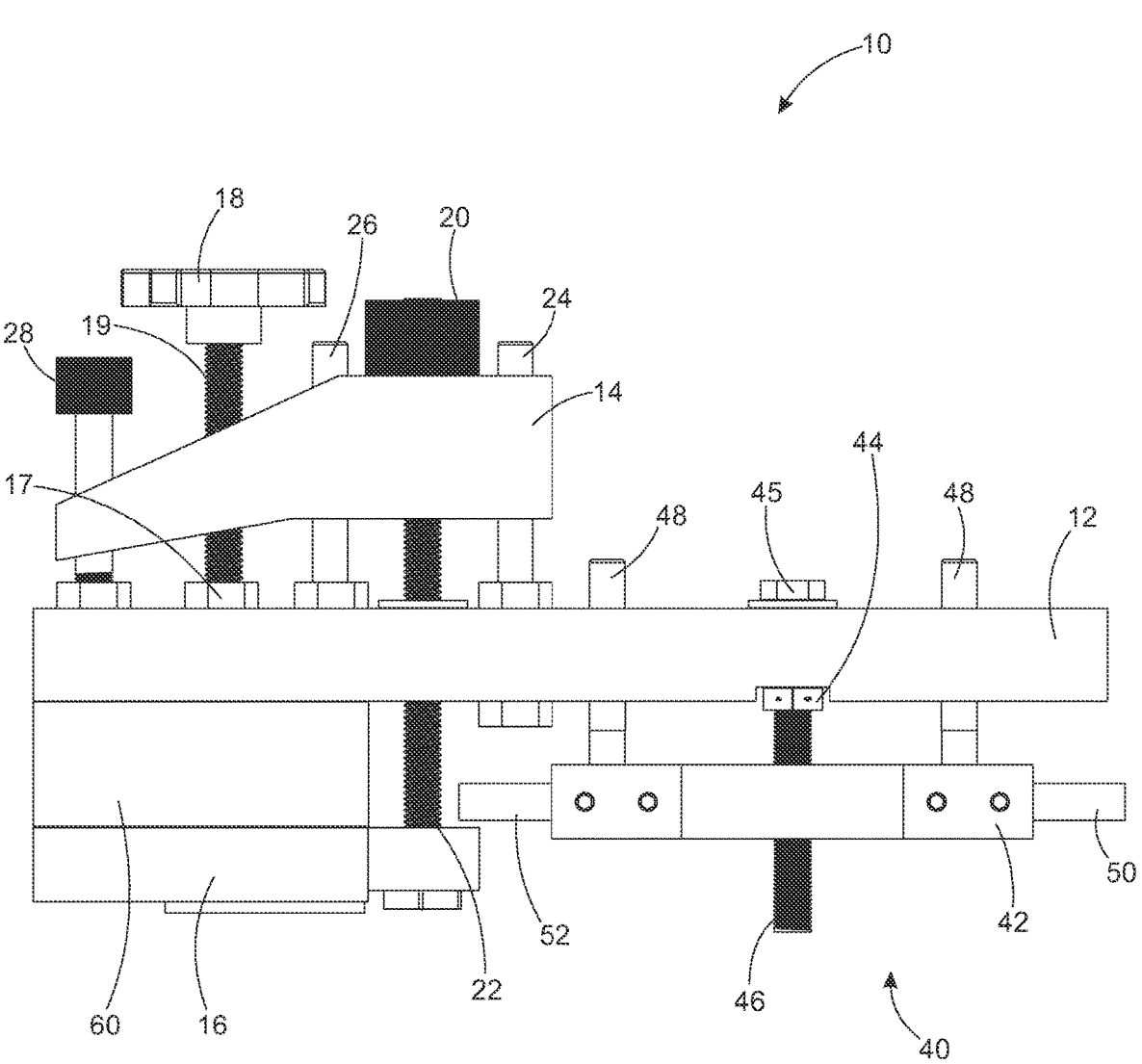
FIG. 5 is a second side view of a coring tool secured to a door, in accordance with the present invention.
Figure 6:
FIG. 6 is a tool body side view of a coring tool secured to a door, in accordance with the present invention.
Figure 6:
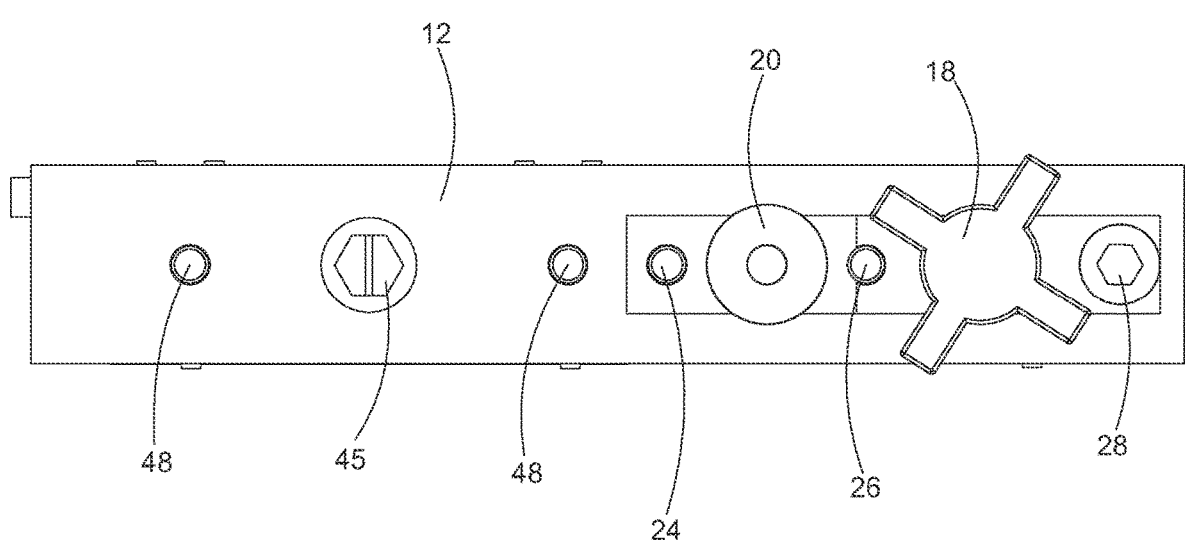
Figure 7:
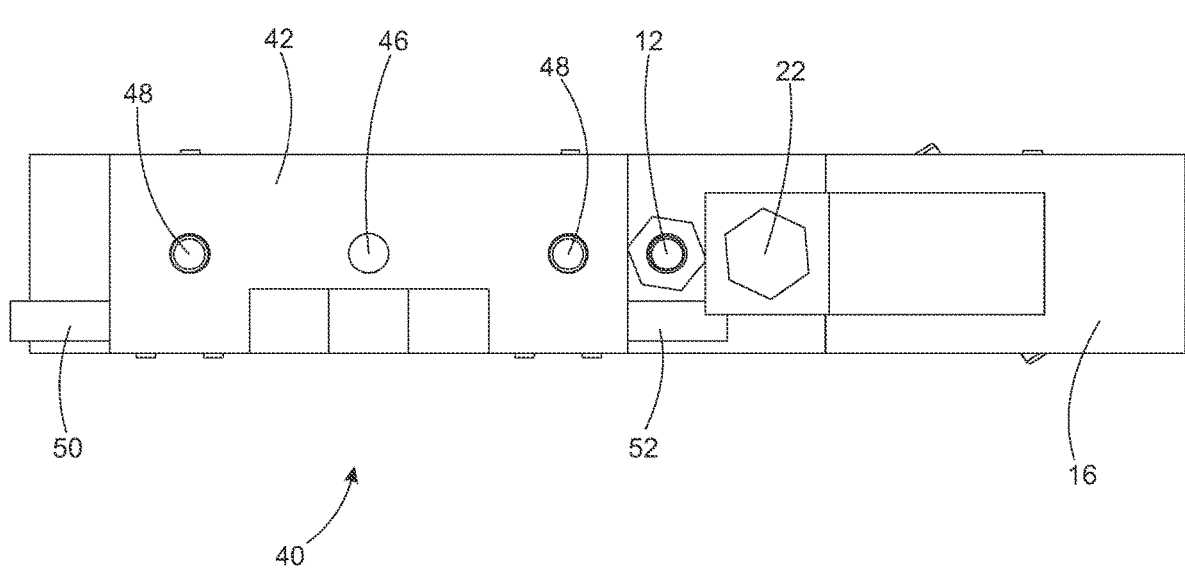
FIG. 7 is a clamp side view of a coring tool secured to a door, in accordance with the present invention.
Figure 8:
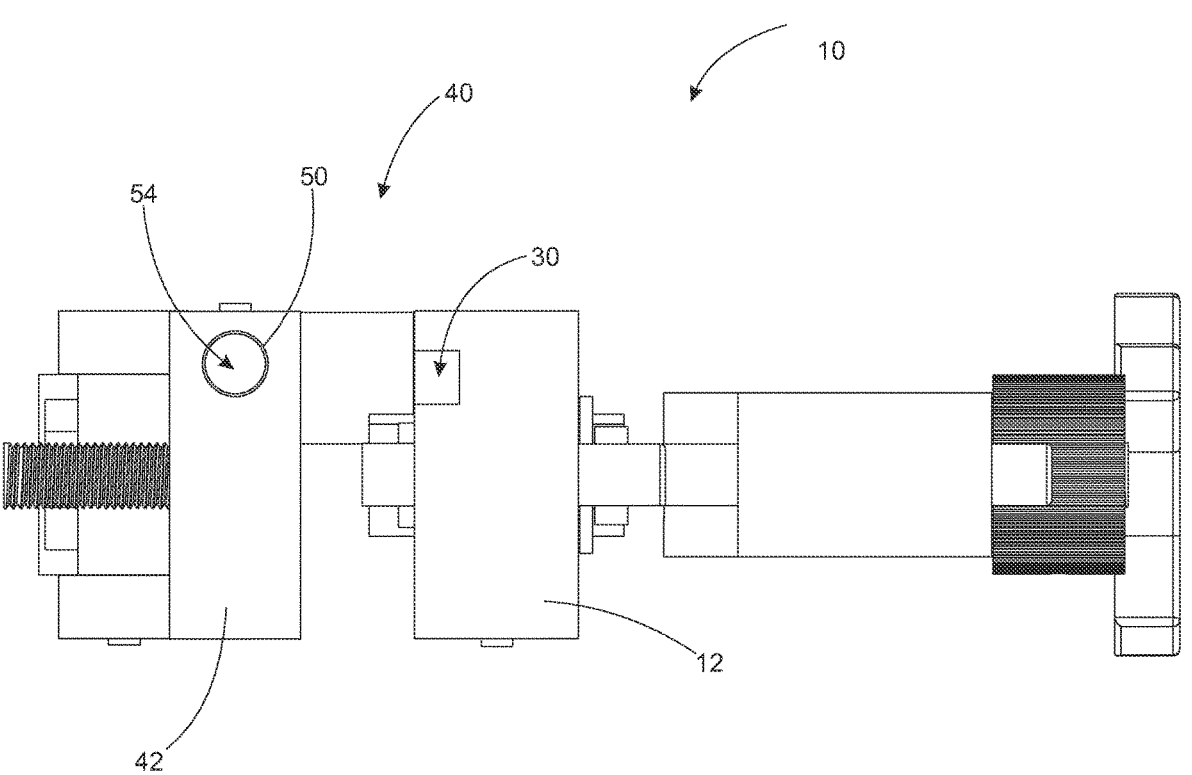
FIG. 8 is a first end view of a coring tool secured to a door, in accordance with the present invention.
Figure 9:
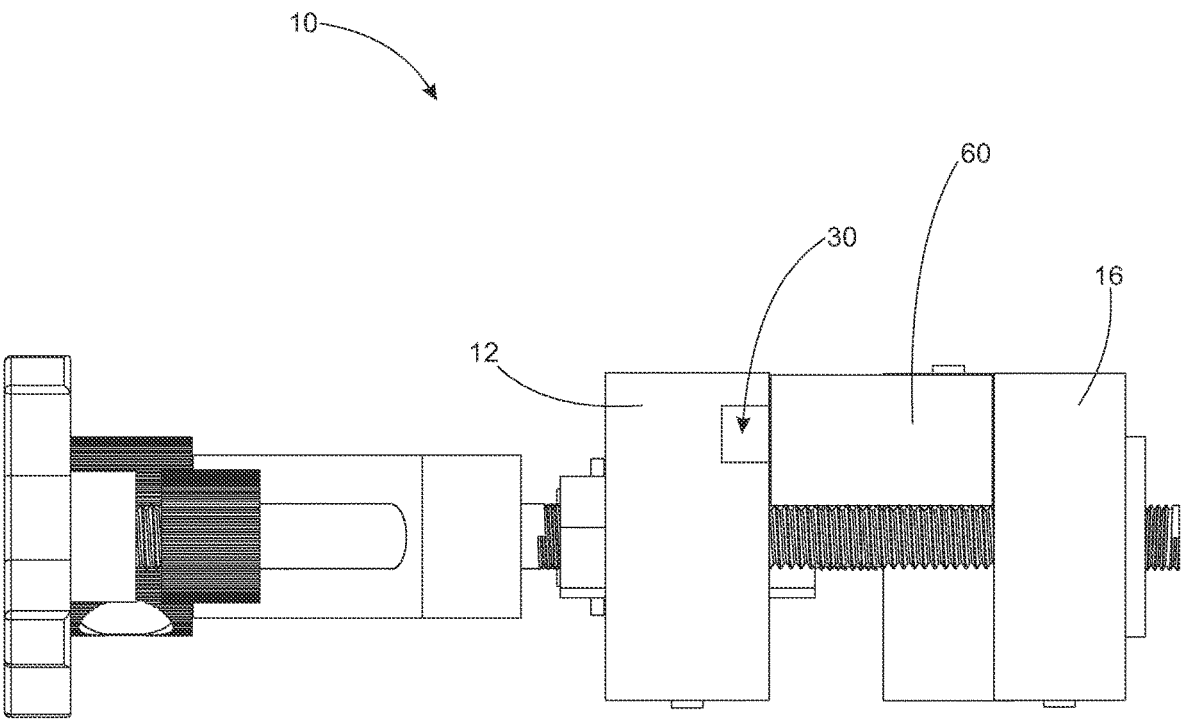
FIG. 9 is a second end view of a coring tool secured to a door, in accordance with the present invention.

As discussed above, embodiments of the present invention relate to coring tools in general and more specifically to coring tools for positioning and guiding drill bits and methods for using such coring tools to drill elongate holes in a door without marring a surface of the door. The present invention comprises a clamping system which may be cantilevered and may be extended to reach the surface of the door, thereby allowing it to be applied to the door while the door is hanging in the door frame. The clamping system may automatically align a coring tool to the coring area, ensuring the pathway for a coring bit is assured without the need for any shimming adjustments to guide the coring bit. Furthermore, the present invention does not provide any restrictions on the angle to which the door can be cored, providing technicians with more versatility to overcome problems in the field.

Referring to the drawings, FIGS. 1-9 depict various views of a coring tool 10, according to an embodiment, the coring tool 10 coupled to a door 60 (wherein in FIGS. 1-9, the door is depicted as a block). The coring tool 10 includes a tool body 12, guide member 14, clamp member 16 and head 40. The guide member 14 is engages the tool body 12 with the use of guide pins 24, 26 and 28 coupled to the tool body 12 with the guide member 14 slidable along the guide pins 24, 26 and 28. A clamp actuator 18 with a threaded post 19 and contact member 17 is threadingly coupled to the guide member 14 and the contact member 17 is configured to contact the tool body 12, such that rotation of the clamp actuator 18 in one direction applies force to the tool body 12 and rotation in the opposite direction releases force on the tool body 12. The clamp member 16 is coupled to the guide member 14 with a bolt 22 coupled to the clamp member 16 and extending through the tool body 12 and coupled on an opposing end of the guide member 14 with a securing member 20 such as a knob 20. The securing member 20 may eb adjusted for fine tuning the separation of the clamping member 16 and the tool body 12.

In operation, the coring tool 10 may be coupled to a door 60 by clamping onto the door face as opposed to the edge of the door 60. This creates a stronger bond to the door 60 and automatically aims the bit to the surface of the door face. To do this, the actuator 18 is rotated to release force on the tool body and allow a space between the tool body 12 and the clamp member 16 to be increased. The clamp member 16 is rotatable (see FIGS. 2-3) and is placed on one side of the door 60 on a door face. The tool body 12 is placed on the opposite door face of the door 60 and the actuator 18 is rotated to apply force to the tool body 12 and reduce the space between the tool body 12 and the clamp member 16 to clamp the door between the tool body 12 and the clamp member 16. The clamping force is distributed evenly across the contact area of the clamping member 16 and corresponding portion of the tool body 12. The guide pins 24, 26 and 28 operate to focus the force of the clamping into the center of the tool body 12. The clamp member 16 and tool body 12 are rotatable with respect to each other (see FIGS. 2-3). This allow the tool body 12 to be turned vertical and turning the tool body 12 in the vertical position enables the end user to clamp the coring tool 10 on a door 60 where an obstruction may exist that prevents the normal clamping procedure. The obstruction may appear on the door 60 or the door frame. The ability to turn the tool body 12 vertically ensures the end user can overcome all obstacles to core the door 60.

Figure 11:
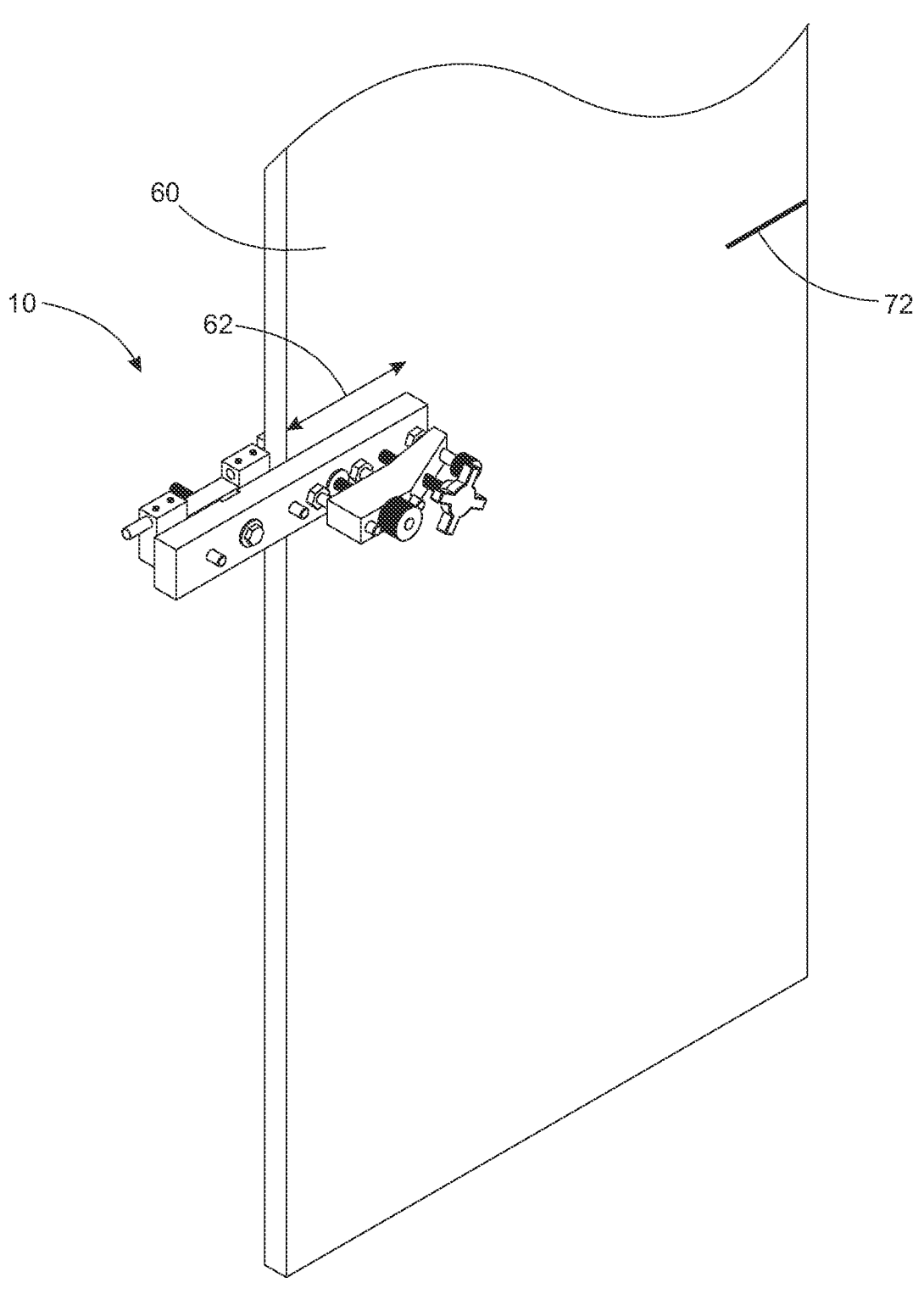
FIG. 11 is a perspective view of a coring tool secured to a door, in accordance with the present invention.
Figure 12:
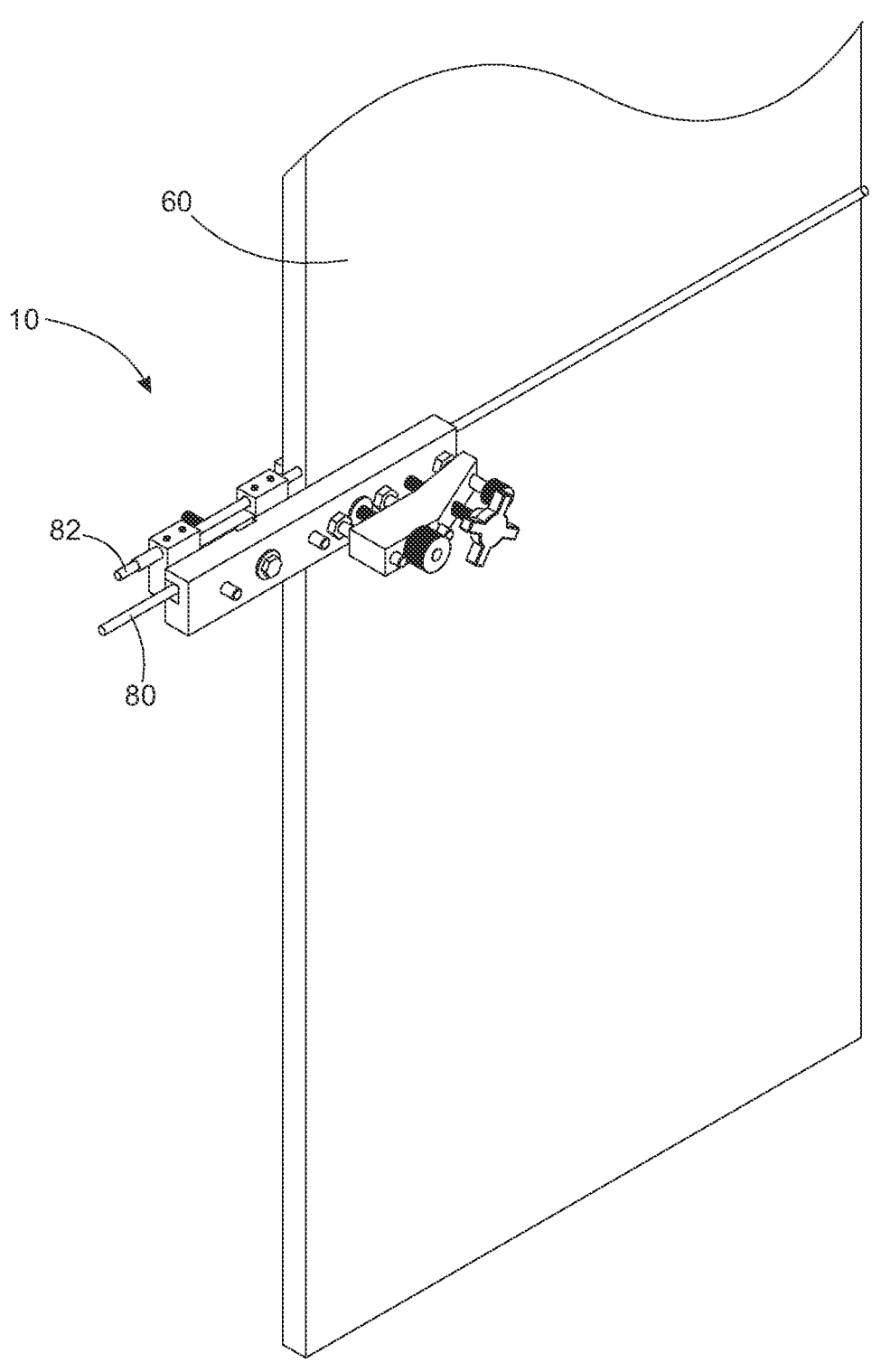
FIG. 12 is a perspective view of a coring tool secured to a door, in accordance with the present invention.

Additionally, the coring tool 10 may be clamped onto the door 60 with the tool body 12 extending a predetermined distance 62 onto the door, as shown in FIG. 11. In some embodiments, the predetermined distance may be at least four inches. In other embodiments the predetermined distance may be between four and five inches. This allows the coring tool 10 to clamp more securely onto the door compared to existing coring tools that clamp on the edge of the door. These existing coring tools are limited because the user cannot tighten the clamp as much as they would like because it clamps to the edge of the door 60 and further the device will be crooked if the sides of the door 60 are not square yet. In operation, the coring tool 10 may be slid onto the door with the tool body 12 extending the predetermined distance 62 and be clamped securely in place and have proper alignment for coring the door 60 whether or not the sides of the door 60 are completely square.

The head 40 of the coring tool 12 comprises a base member 42 having a first guide bushing 50 and a second guide bushing 52 with a bit aperture 54 extending through the guide bushings 50 and 52 and extending through the base member 42 in areas that the guide bushings 50 and 52 are coupled to the base member 42. The base member 42 is coupled to the tool body 12 with head pins 48 a head actuator 44 with a bolt 46 having a bolt head 45, wherein the head pins 48 are fixed to the base member 42 and extend through the tool body 12 and are slidable through the tool body within apertures through the tool body 12. The head actuator 44 is coupled to the base member 42 with a threaded engagement. Rotation of the bolt head 45 rotates the bolt 46 to adjust the distance the base member 42 is from the tool body 12. Once the coring tool 10 is coupled or clamped to the door 60, the head actuator 44 may operate to adjust the guide bushings 50 and 52 to center the bit aperture 54 on the door 60. The adjustment of the head 40 can be utilized in some embodiments to locate the bit aperture and the guide bushings 50 and 52 on doors with thickness from one inch to three inches. The head 40 of the coring tool 12 may be easily adjusted in a short amount of time using a large screwdriver or open end wrench. Furthermore, several different bushing designs are available, allowing technicians to choose the bit diameter that best fits their needs, ranging from ¼ inch diameter up to ½ diameter. The adjustment feature solves a major problem for end users by allowing for adjustments to various sized doors made from a variety of materials, higher pressures, internal reinforcements, of different dimensions in thickness after clamping the coring tool 10 to the door and enables the technician to comply with certain building codes if required.

The tool body 12 may further include an aiming slot 30 extending from a first end of the tool body 12 through a second end of the tool body 12. A coring bit 80 mat be extended through the aiming slot 30 and across the door face of the door 60, thereby designating the line the starter bit 82 and the coring bit 80 will extend into and through the door respectively. This ensures the proper alignment of the entry and exit locations fo the coring bit 80.

Figure 10:
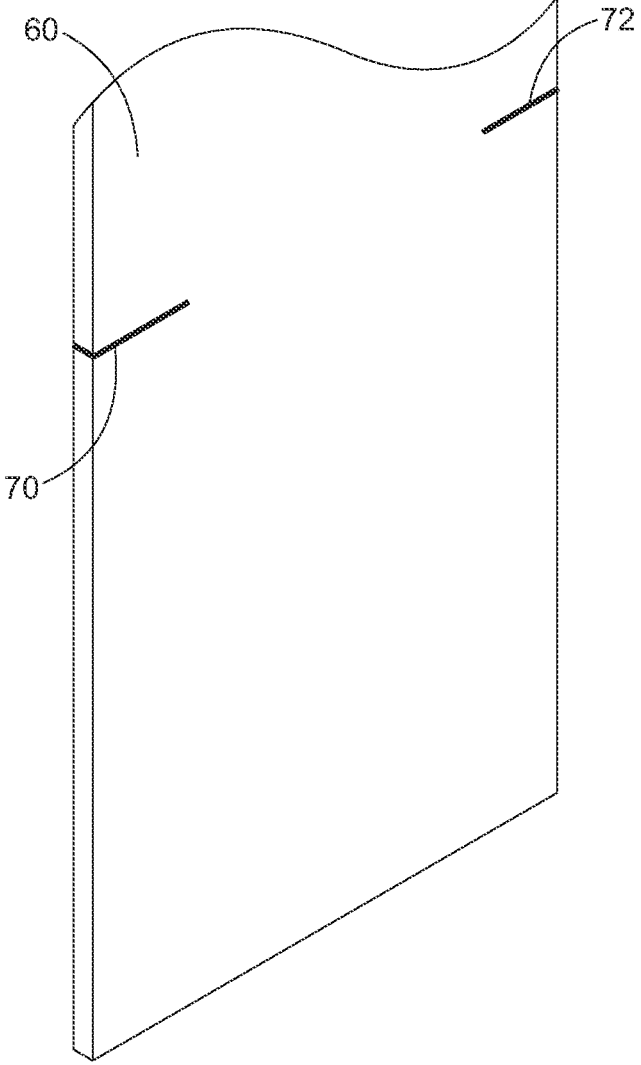
FIG. 10 is a perspective view of a door, in accordance with the present invention.
Figure 13:
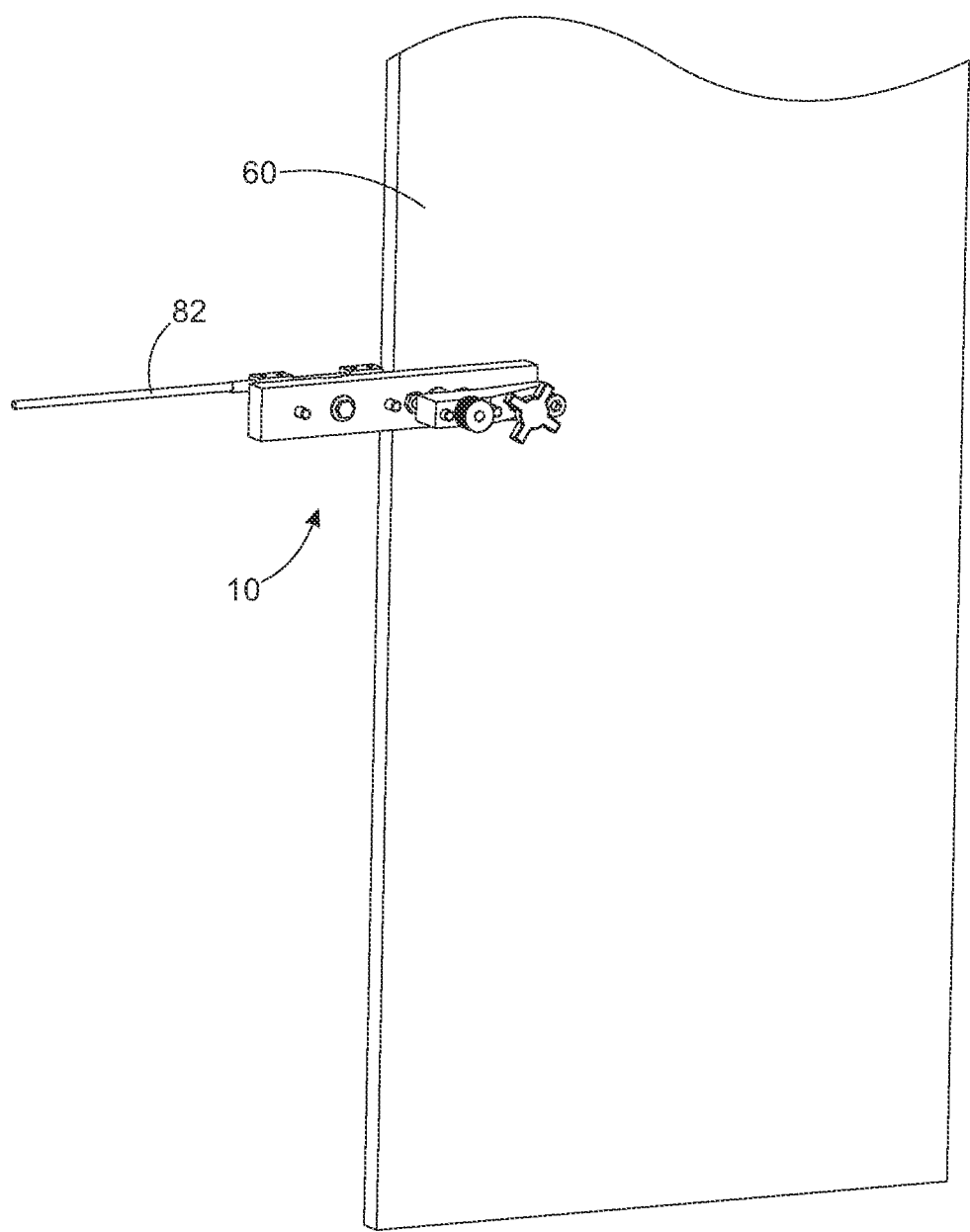
FIG. 13 is a perspective view of a coring tool secured to a door, in accordance with the present invention.
Figure 14:
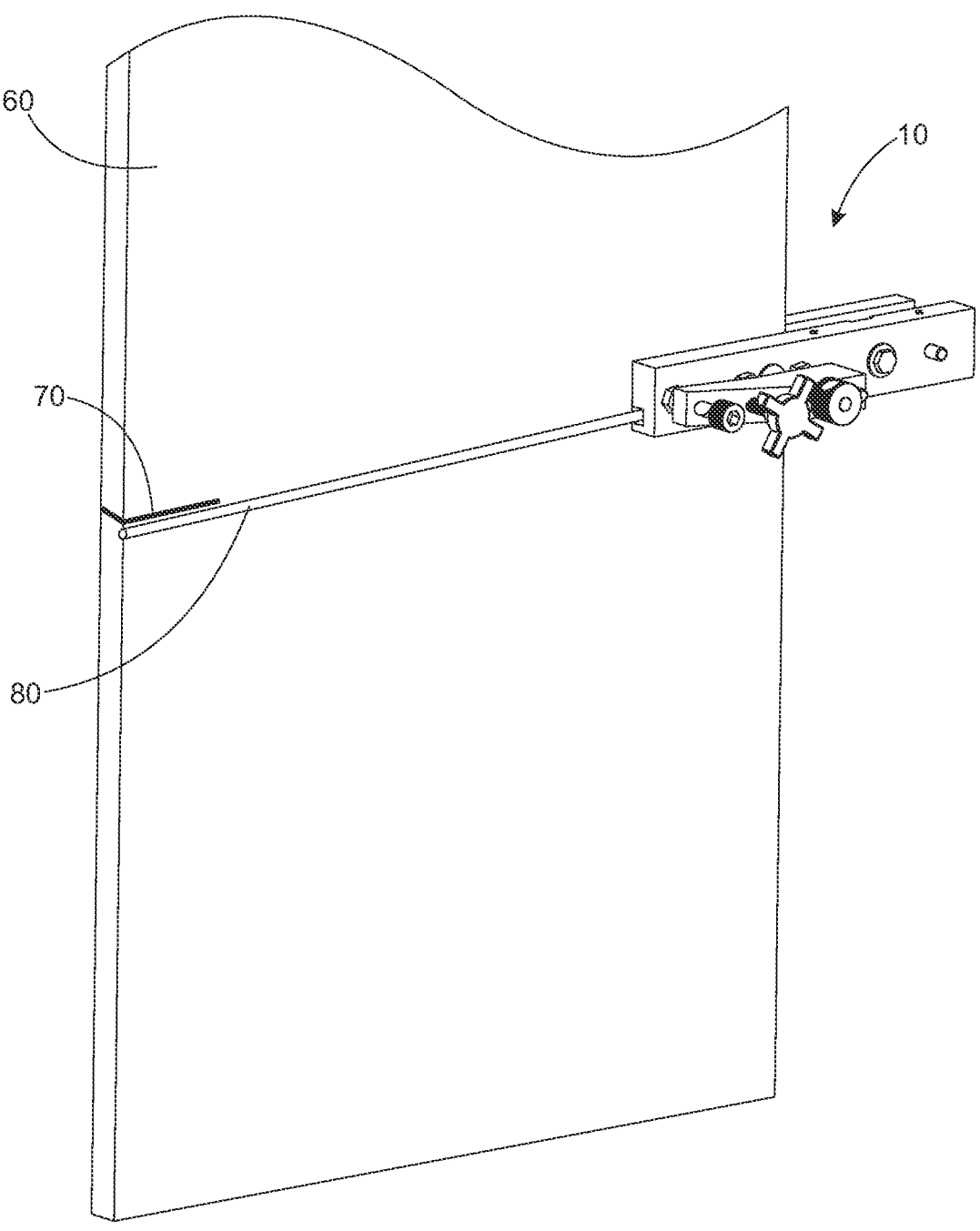
FIG. 14 is a perspective view of a coring tool secured to a door, in accordance with the present invention.

Referring to FIGS. 10-14, a method of operating a coring tool 10 is depicted in accordance with an embodiment. As shown in FIG. 10, the user may place marks 70 and 72 on the door 60 to indicate the bit entry points to core the door. The coring tool 10 may then be lightly coupled to the door 60 and located at one of the marks on the door 60, such as mark 70, as shown in FIG. 11. The user may then insert a starter bit 82 into the bushing aperture 54 through the bushing guides 50 and 52 and align the starter bit 82 with the starting mark 70 and adjust the head 40 to desired location based on size of the door 60, shown in FIG. 12. As further shown in FIG. 12, the coring bit 80 may be inserted through the aiming slot 30 of the tool body 12 and extended along a door face of the door 60 and then aligned with the other mark 72 on the door 60. Once the starter bit 82 is aligned with the first mark 70 and the coring bit 80 is aligned with the second mark 72, the clamp actuator 18 may be rotated to tighten the clamping of the door between the tool body 12 and the clamping member 16 to secure the coring tool 10 to the door 60 and ready for coring. Using the starter bit 82, the user may drill into the door 60 to a depth of approximately sixteen inches as shown in FIG. 13. Then, as shown in FIG. 14, the user may then reverse the coring tool 10 to the other side of the door 60, align the starter bit with the mark 72 and the coring bit with mark 70 and drill the starter bit 82 to a depth of approximately sixteen inches into the door 60. The starter bit 82 may then be removed from the guide bushings 50 and 52 and the coring bit 80 may then be inserted within the guide bushings 50 and 52 and the drilled to core the door by connecting the two sixteen inch starter cores to create a perfect core through the door 60.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:
1. A coring tool comprising:
a tool body having a first end and an opposing second end;
a clamp member coupled to the tool body adjacent the second end, the tool body and the clamp member being moveable toward and away from each other in response to operation of a clamp actuator;
a guide member coupled to the clamp member by a bolt extending through the tool body and coupled on an opposing end of the guide member with a securing member, wherein the securing member adjusts the separation of the clamp member and the tool body; and
a head having guide bushings for inserting a bit through the guide bushings for coring a door, the head being coupled adjacent the first end of the tool body and being movable toward and away from the tool body to align the guide bushings with the door to be cored.

2. The coring tool of claim 1, wherein the head further comprises a bit aperture extending through the guide bushings and the bit aperture extending through a base member in areas of the base member that the guide bushings are coupled to the base member.

3. The coring tool of claim 2, wherein the base member is coupled to the tool body with head pins and a head actuator with a bolt having a bolt head, and wherein the head pins are fixed to the base member and slidable through apertures through the tool body, and wherein rotation of the bolt head rotates the bolt to adjust the distance the base member is from the tool body.

4. The coring tool of claim 3, wherein the head actuator is utilized to adjust the guide bushings to center the bit aperture on the door.

5. The coring tool of claim 1, wherein the guide member is slidable along guide pins coupled to the tool body, and wherein the guide member is adjustable along the guide pins to accommodate different door thicknesses.

6. The coring tool of claim 1, wherein the securing member is a knob.

7. The coring tool of claim 1, wherein the tool body extends a predetermined distance onto the door when coupling the coring tool to the door.

8. The coring tool of claim 7, wherein the predetermined distance is at least four inches.

9. The coring tool of claim 7, wherein the predetermined distance is between 4 inches and five inches.

\* \* \* \* \*